United States Patent [19]

Ogawa et al.

[11] 4,420,248
[45] Dec. 13, 1983

[54] VARIABLE MAGNIFICATION COPYING DEVICE

[75] Inventors: Ryota Ogawa, Kawagoe; Ikuo Negoro, Tokyo; Hisao Iwanade, Tsurugashima; Yasunori Arai, Asaka, all of Japan

[73] Assignee: Asahi Kogaku Kogyo Kabushiki Kaisha, Tokyo, Japan

[21] Appl. No.: 244,476

[22] Filed: Mar. 16, 1981

[30] Foreign Application Priority Data

Mar. 25, 1980 [JP] Japan .................................. 55-37841

[51] Int. Cl.³ ........................................... G03B 27/52
[52] U.S. Cl. .................................................... 355/57
[58] Field of Search ......................... 355/55, 56, 57, 58

[56] References Cited

U.S. PATENT DOCUMENTS

| | | | |
|---|---|---|---|
| 1,498,472 | 6/1924 | Mohler | 355/58 |
| 2,704,484 | 3/1955 | Schwesinger | 355/58 |
| 3,355,236 | 11/1967 | Taillie et al. | 355/57 |
| 3,901,586 | 8/1975 | Suzuki et al. | 355/57 |
| 4,077,710 | 3/1978 | Ward et al. | 355/58 |
| 4,107,714 | 8/1978 | Raab | 355/58 |
| 4,142,793 | 3/1979 | Schilling | 355/58 |
| 4,209,248 | 6/1980 | Gibson et al. | 355/58 |

Primary Examiner—Monroe H. Hayes
Attorney, Agent, or Firm—Sughrue, Mion, Zinn, Macpeak & Seas

[57] ABSTRACT

A varying magnification copying device of small size and low manufacturing cost in which a region of movement of a zoom lens system for an enlargement copying operation is shared with a region of movement of a half-speed mirror for the equal magnification and reduction copying operations. The zoom lens system is moved along the optical axis thereof by a feed screw rotated by a digitally-controlled stepping motor. The zoom lens system, which includes front and rear frames varying front and rear lens systems, is adjsuted in magnification factor by a cam and cam follower mounted on the rear and front frames, respectively. The cam is rotated by a pinion gear which is engaged with a rack which extends parallel to the feed screw. Movement of the zoom lens system perpendicular to the optical axis is accomplished through a lead cam and cam follower.

9 Claims, 10 Drawing Figures

VARIABLE MAGNIFICATION COPYING DEVICE

BACKGROUND OF THE INVENTION

In general, a copying machine is used to copy an original without changing its size. This type of copying operation will be hereinafter referred to as "an equal magnification copying operation" when applicable. However, in the case where it is required to carry, arrange or store newspapers, large drawings or large documents for instance, it is desirable that the copying machine be capable of copying an original at a reduced size. This type of copying operation will be hereinafter referred to as "a reduction copying operation" when applicable. A variety of copying machines of this type are commercially available.

On the other hand, a copying machine having a mechanism for copying an original at an increased size (hereinafter referred to as "an enlargement copying operation" when applicable) can change the size of an original such as a small drawing into a larger one so that the original can be read with ease, or it can be used to make uniform the sizes of various documents such as changing size B5 literature or textbooks into size A4. However, it is unavoidable that such a copying machine employs an intricate mechanism and is bulky.

Accordingly, it is desirable to provide a compact copying machine which can carry out ordinary copying operations, namely, an equal magnification copying operation, an enlargement copying operation and a reduction copying operation, and can handle not only reduction factors such as a linear magnification of 0.866 for reducing an "A column" size document into a "B column" size document (for instance, from A3 to B4) and a linear magnification of 0.707 for reducing an "A column" size document into a different "A column" size (for instance from A3 to A4) and enlargement factors such as a linear magnification of 1.155 for increasing a "B column" size document into an "A column" size (for instance from B4 to A3) and a linear magnification of 1.414 for increasing an "A column" size document into another "A column" size (for instance from A5 to A4), but also a desired continuously variable magnification, for instance between 0.707 and 1.414 independent of the particular fixed "A column" and "B column" standard sizes.

The case will be considered where the image of an original is increased in size, for instance, by further increasing a movement set value in an application of an equal magnification or reduction copying system in which, as disclosed in Japanese Laid-Open Patent Application No. 65736/1978, the image forming lens and the mirror in the scanning optical system are moved. This system suffers from the difficulties that the required mechanism is intricate and it is necessary to manufacture the mechanism with high accuracy with the result that the manufacturing cost is considerably high. On the other hand, in a mechanism employing a zoom lens, in general, a long cam groove is formed in the lens frame and zooming is carried out by using the groove as a guide. This mechanism is disadvantageous in that the strength of the lens frame generally tends to be low and accordingly the lens frame is liable to be deformed, and that it is rather difficult to manufacture the lens frame. Furthermore, the mechanism is disadvantageous in that it is bulky as a whole. Especially in a copying machine, the zoom lens is usually driven by an electric motor. Therefore, in order to position the zoom lens at a predetermined distance, a stop mechanism and a motor control device must be used in combination with the result that the mechanism is necessarily intricate in construction and has a high manufacturing cost.

SUMMARY OF THE INVENTION

An object of the invention is to provide a variable magnification copying optical device having a low manufacturing cost and high accuracy in which a zoom lens system and an electric motor which is controlled by a numerical control device such as a microprocessor are employed. In the copying device of the invention, the zoom lens system is suitably positioned to provide an image forming optical system for copying an original at a desired magnification whereby the above-described difficulties attributed to the necessity for moving the mirror and for setting the zoom lens with the long cam groove as a guide are completely eliminated.

More specifically, the invention provides a variable magnification copying device having a copying optical system capable of both enlarging and reducing the image of an original or producing a copy of this same size. In this device a full-speed mirror is provided for scanning a predetermined copying size document. A half-speed mirror follows the full-speed mirror. A zoom lens system and means for moving the zoom lens system follows the half-speed mirror. The region of movement of the zoom lens system for an enlargement copying operation is shared with the region of movement of the half-speed mirror for an equal magnification copying operation or a reduction copying operation, that is, the space which is used for moving the zoom lens system for an enlargement copying operation is the same as that used for movement of the half-speed mirror for the equal magnification and reduction copying operations. The zoom lens moving means includes an electric drive motor, a mechanism for moving the zoom lens system in the direction of the optical axis of the lenses thereof in response to rotation of the electric motor to set the zoom lens system at a position corresponding to a specified magnification (magnification factor), and a mechanism for moving the zoom lens system perpendicularly to the optical axis to set a copying image of an original document at a predetermined position.

The mechanism for moving the zoom lens system in the direction of the optical axis to set the zoom lens system at a position corresponding to a specified magnification preferably includes a feed screw driven by the electric motor, a nut threadedly engaged with the feed screw and coupled to a frame member of the zoom lens system spaced to move the frame member in accordance with the rotation of the feed screw, a cam, a cam follower abutting against the cam, a pinion gear which turns the cam, and a rack engaged with the pinion gear. The mechanism for moving the zoom lens system perpendicularly to the optical axis to set the copying image of the original at a predetermined position includes a lead cam in a cam follower with the cam follower being moved along the lead cam in response to rotation of the feed screw.

DESCRIPTION OF THE PREFERRED EMBODIMENTS

The invention will be described with reference to a preferred embodiment shown in the accompanying drawings.

Figure 1:
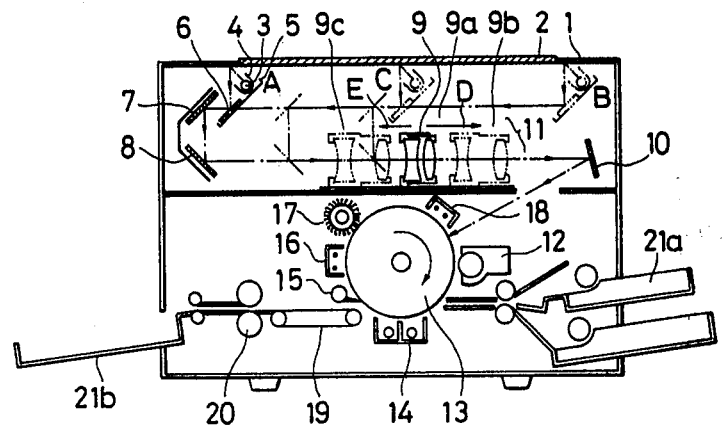
FIG. 1 is an explanatory diagram showing an example of a copying machine to which the invention is applied.

First, a generalized example of a copying machine to which the invention is applied will be described. In FIG. 1, reference numeral 2 designates a contact glass plate, which serves as an original holding stand, provided on a body frame 1. An original placed on the contact glass plate 2 is illuminated or scanned by a photoelectric lamp 3 which reciprocates between a standby position A and a finished position B. An illuminating unit 5 includes the photoelectric lamp 3, a reflecting mirror 4 and a full-speed mirror 6 which are mounted on a single member so that they reciprocate as a unit. Light reflected by the full-speed mirror 6 is reflected by a half-speed mirror composed of mirrors 7 and 8 and is then applied to a zoom lens system 9 in a magnification varying unit 11, which is here shown at an equal magnification position 9a. The light from the zoom lens system 9, after being reflected by a stationary mirror 10, is projected onto a photosensitive drum 13 and an electrostatic latent image is formed on the drum 13. The latent image thus formed is developed by a developing unit 12 according to a conventional method. The image thus developed is transferred onto a copying sheet from a sheet supplying unit 21 by a transferring charger 14. Then, the copying sheet is separated from the photosensitive drum 13 by a separating pawl 15. The sheet thus separated is delivered to a fixing unit 20 by a sheet delivering unit 19 where it is subjected to fixing. The fixed sheet is delivered to a discharge sheet cassette 21b. The photosensitive drum 13, after passing the transferring charger 14, is discharged by a discharging charger 16 and is then cleaned by a cleaning unit 17. The photosensitive drum 13 thus treated is charged by a charger 18 so as to be ready for the next projection. The above-described operation is repeatedly carried out.

The process by which the image of the original on the contact glass 2 is repeatedly formed on the photosensitive drum 13 by the scanning operation of the illuminating unit 5 and the image thus formed is copied on the copying sheets through the developing and transferring steps has been described. In this connection, in the optical scanning operation, the mirrors 7 and 8 forming the half-speed mirror and mounted on the respective mounting members are moved as a single unit in synchronization with the scanning movement of the illuminating unit 5. The half-speed mirror (7 and 8) is moved at a suitable speed, nominally at a speed which is half of the speed of the illuminating unit 5, so that the length of an optical path between the original illumination position and the zoom lens system 9 is maintained unchanged.

The magnification factor variation of the copying machine thus arranged will be described. The light reflected from the original is reflected by the full-speed mirror 6 and is then reflected by the half-speed mirror (7 and 8). The light thus reflected is applied to the zoom lens system 9 which is moved to a specified magnification position, for instance to the zoom lens system 9b (or 9c) which is achieved by moving in the direction of the arrow D (or E). The emergent light from the zoom lens system is reflected by the stationary mirror 10, as a result of which the magnified image of the original on the contact glass plate 2 is projected onto the photosensitive drum 13 and its electrostatic latent image is formed thereon. The electrostatic latent image is developed by the developing unit 12 and the developed image then transferred onto the copying sheet by the transferring unit 14. The copying sheet is delivered to the fixing unit 20 and is then delivered out of the copying machine by the sheet delivering unit 19. As is apparent from the above description, the magnification can be varied by moving only the zoom lens system 9 in the magnification varying unit 11.

An example of a zoom lens system which is suitable for the invention will be described with reference to FIGS. 1 and 2. In this example, a two-group type zoom lens is employed. That is, the zoom lens system is made up of a front group lens system 22 having a negative refractive power and a rear group lens system 23 having a positive refractive power to perform an image formation. When it is required to vary the magnification, the front group lens system 22 and the rear group lens system 23 are moved along the optical axis according to the required magnification variation factor as a result of which the magnified image of the original can be projected onto the photosensitive drum 13 with the length of the optical path from the surface of the original to the image forming plane maintained unchanged.

Now, the spatial relationship between the half-speed mirror and the zoom lens system will be described with reference to FIG. 2. When the half-speed mirror (7 and 8) is run, it approaches the lens system at the end of its movement (at the right-hand side in FIG. 2), and accordingly it is necessary to prevent the half-speed mirror and the lens system from being brought into contact with each other. Further, the movement of the lens system is such that, when it is required to increase the magnification factor, the position of the principal point of the lens system is moved towards the original (or the half-speed mirror) i.e. to the left-hand side. If the range of movement of the half-speed mirror (7 and 8) is set so as to avoid contact with the lens system, then the size of the copying machine is necessarily increased.

This difficulty is eliminated by employing the following technique. The distance between the run end position of the half-speed mirror (7 and 8) and the zoom lens system is made as short as possible for an equal magnification copying operation as indicated in the middle part of FIG. 2. For enlargement copying operations, the lens system is shifted to the left-hand side in the upper part of FIG. 2. However, the size of an original is initially smaller in the enlargement copying operation and therefore the run length of the half-speed mirror can be smaller. Thus, the space occupied by the zoom lens system for the enlargement copying operations can be used in common with the running region of the half-speed mirror for the equal magnification copying operations or the reduction copying operations. This is effective in decreasing the size of the copying machine. For instance, unlike a system of copying an original at equal magnification or at reduced magnification with a zoom lens system only, it is not required to increase the size of the overall system. For the equal magnification copying operations or for the reduction copying operations, a technique is preferably employed by which the copying speed of a small original is increased by decreasing the scanning distance. If the scanning distance obtained by stopping the half-speed mirror midway is made equal to the scanning distance for the enlargement copying operation, then the enlarging copying mechanism can be effectively simplified.

Figure 3:
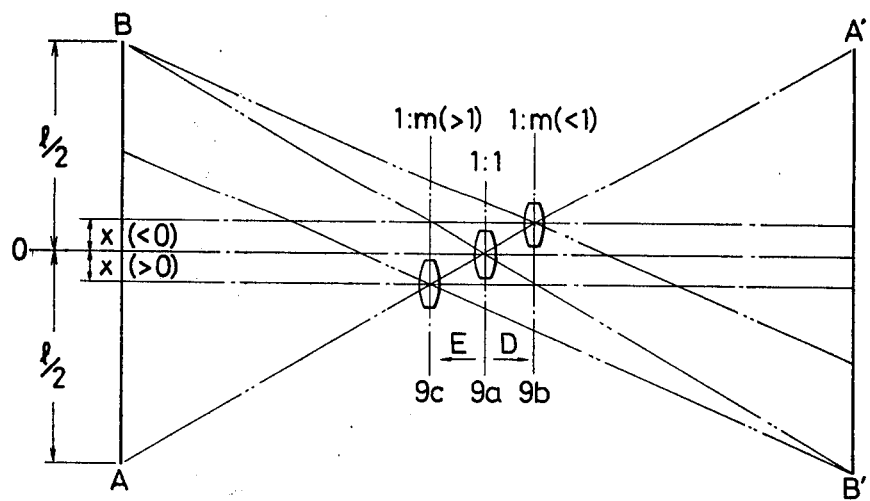
FIG. 3 is an explanatory diagram indicating the movement of the entire zoom lens system in a direction perpendicular to the optical axis.

As shown in FIG. 3, if, in varying the magnification factor, the lens system is moved as much as an amount x corresponding to the magnification variation factor m perpendicularly to the optical axis to set the end A of an original AB at the reference position, then the image A' of the end A is formed at a fixed position at all times irrespective of the magnification variation factor m. Accordingly, one edge of a copying sheet can always be set at a predetermined position with the image A as a reference. This is convenient in operation and simplifies the required mechanism.

If the amount of movement of the lens system in a direction perpendicular to the optical axis is represented by x with the position of the lens system in the equal magnification copying operation as a reference, the positive direction is chosen to correspond to downward movement in FIG. 3, the length between the center O of the original and the end A of the original is represented by l/2, and the magnification variation factor is represented by m, then, $(l/2-x)/(l/2+x)=1/m$. Therefore, $$x = \frac{m-1}{m+1} \times \frac{l}{2}.$$

As is apparent from the above description, in order to vary the magnification factor, the zoom lens system requires a mechanism which moves the front group lens system 22 and the rear group lens system 23 by predetermined amounts according to the magnification variation factor along the optical axis, and also a mechanism which moves the entire zoom lens system by an amount corresponding to the magnification variation factor in a direction perpendicular to the optical axis.

Figure 4:
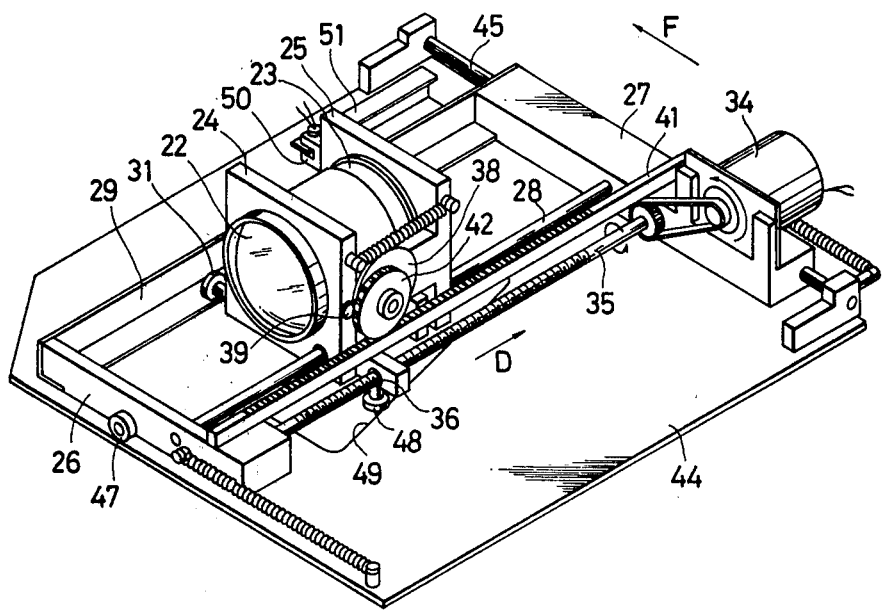
FIG. 4 is a schematic perspective view showing an example of a magnification varying unit according to the invention.

An example of the magnification varying unit 11 for moving the zoom lens system 9 described above will be described. FIG. 4 is a schematic perspective view of the magnification varying unit 11. The zoom lens system is made up of a front group lens system 22, a front frame 24 holding the front group lens system 22, a rear group lens system 23, and a rear frame 25 holding the rear group lens system 23. For moving the zoom lens system in the direction of the optical axis, a feed screw 35 is turned by a stepping motor 34 to move the rear frame 25 thereby to hold the rear group lens system 23 at a specified magnification position, and a cam 38 is turned by a rack 41 and a pinion gear 42 operating a cam follower 39 which abuts against the cam 38 thereby to provide a specified magnification distance between the front group lens system 22 and the rear group lens system 23. For moving the zoom lens in the direction perpendicular to the optical axis, the movement of the rear frame 25 which is driven by the stepping motor 34 is utilized. That is, the zoom lens system is moved perpendicularly to the optical axis by a cam follower 48 which is fixedly secured to the rear frame 25 and by a lead cam 49 which abuts the cam follower 48.

Specific components of the magnification varying unit 11 will be described with reference to FIGS. 5 through 9.

Figure 5:
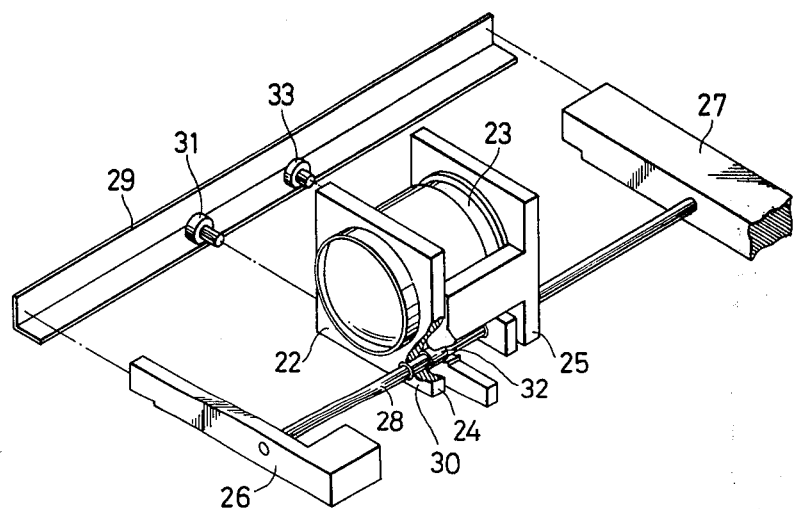
FIGS. 5 through 9 are diagrams showing various components of the magnification varying unit in FIG. 4.

FIG. 5 shows a guide structure for guiding the zoom lens system in the direction of the optical axis. The zoom lens system is guided by a guide bar 28 and a guide rail 29 which extend between a front plate 26 and a rear plate 27 and are fixedly secured thereto at both ends, and by dry bearings 30 and 32 and ball bearings 31 and 33. The two dry bearings 30 and 32 are mounted on each of the front and rear frames 24 and 25 and slide on the guide bar 28. The ball bearings 31 and 33 are rotatably supported by the front frame 24 and the rear frame 25, respectively, and roll along the guide rail 29. The front frame 24 and the rear frame 25 use the same guide structure. Therefore the front group lens system 22 and the rear group lens system 23 are guided without being shifted off the optical axis.

Figure 6:
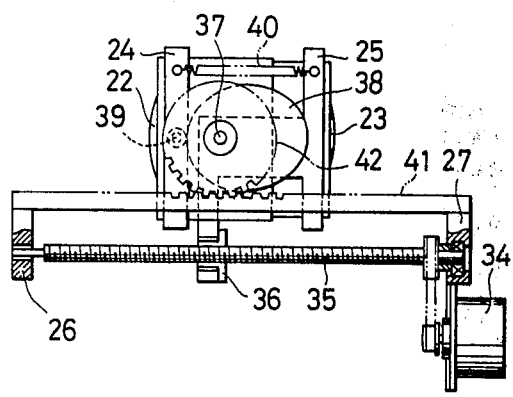

FIG. 6 shows a driving structure for moving the zoom lens system in the direction of the optical axis. In order to set the zoom lens system at a specified magnification position, the rear group lens system 23 mounted on the rear frame 25 is moved to the specified magnification position by the guide structure shown in FIG. 5 and then the front group lens system in the front frame 24 is spaced by a distance corresponding to the specified magnification factor from the rear group lens system 23.

First, the movement of the rear group lens system 23 to a specified magnification position will be described. The feed screw 35 is rotatably supported between the front plate 26 and the rear plate 27 and is engaged with a nut 36 which is secured to the rear frame 25. As the feed screw 35 is turned by its drive source, namely, the stepping motor 34, the rear frame 25 is moved with the nut 36. Thus, the rear group lens system 23 is moved to the specified magnification position and held there by applying to the stepping motor 34 signals representative of a direction of movement and by supplying a number of pulses which corresponds to the amount of movement of the rear group lens system 23.

Next, the provision of a distance corresponding to a specified magnification between the rear group lens system 23 and the front group lens system 22 will be described. In order to provide the desired distance between the two lens systems 23 and 22, the cam 38 which is rotatably mounted on a cam shaft 37 fixedly secured to the rear frame and the cam follower 39 which abuts against the cam 38 and is rotatably supported by the front frame 24 are used; more specifically the cam 38 is turned. In association with the movement of the rear frame 25 to the specified magnification position in the above-described manner, the cam 38 is turned by the rack 41 fixedly secured between the front plate 26 and the rear plate 27 and by the pinion gear 42 mounted on the cam 38. The cam 38 has a shape determined such that the distance between the front group lens system 22 and the rear group lens system 23 is maintained accurately. A spring 40 is connected between the front frame 24 and the rear frame 25 to urge the cam follower 39 against the cam 38 and to thus following the cam 38 with a high accuracy.

Figure 7:
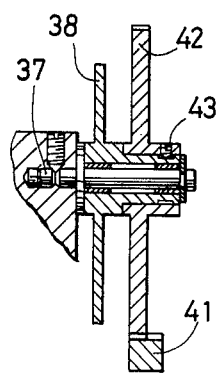

FIG. 7 shows the arrangement of the cam 38, the pinion gear 42 and the rack 41. The cam 38 is rotatably mounted on the cam shaft 37 which is fixedly secured to the rear frame 25. The pinion gear 42 is engaged with the rack 41 and is fitted on the cam 38. To adjust the cam, after the cam is set at a reference position or after the zoom lens system is set at the equal magnification (1:1) position 9a in FIGS. 1 or 2 with the position 9a as a reference, the pinion gear 42 is fixedly secured to the cam 38 with a set screw 43.

Figure 8:
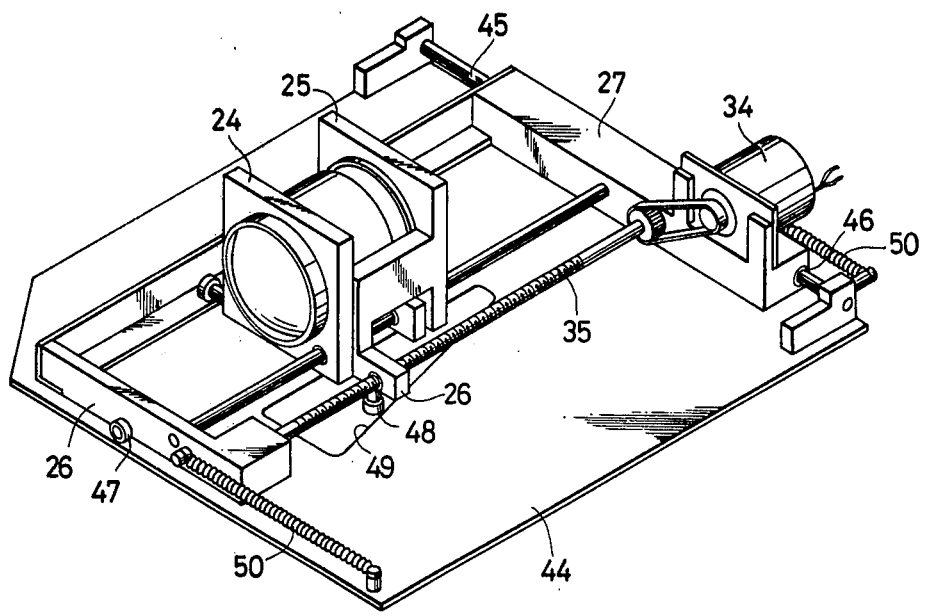

FIG. 8 shows the guide structure for guiding the zoom lens system perpendicularly to the optical axis and the drive structure for moving the zoom lens system in the same direction. The zoom lens system is guided by a base plate 44, a guide bar 45 secured to the base plate 44, a dry bearing which is fitted in the rear plate 27 and slides on the guide bar 45, and a ball bearing 47 which is rotatably mounted on the front plate 26 and rolls on the base plate 44. In association with the movement of the rear frame 25 to a position corresponding to a specified magnification by the above-described guide structure, the zoom lens system is moved perpendicularly to the optical axis by the lead cam which is formed in the base plate 44 and the cam follower 48 which abuts against the lead cam 49. The cam follower 48 is rotatably supported by the rear frame 25 and abuts against the lead cam 49 by means of two springs 50 so that the cam follower 48, rolling on the curve of the lead cam 49, follows the lead cam 49 with a high accuracy.

Figure 9:
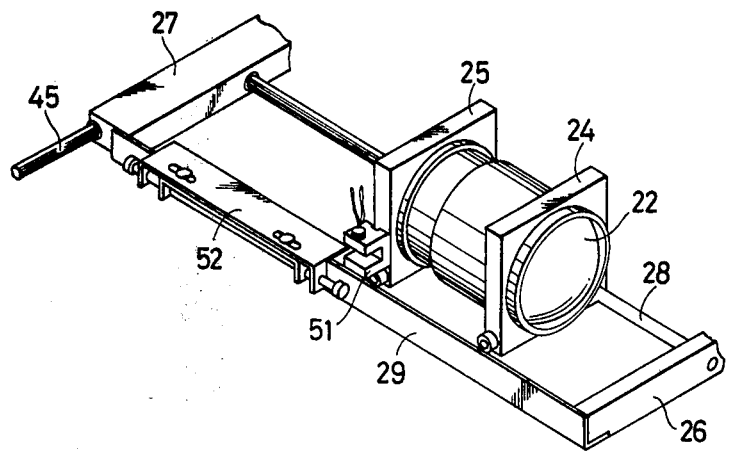

FIG. 9 shows a position detecting device for the zoom lens system. For example, if the zoom lens system is moved to a specified magnification position from the equal magnification (1:1) position which is often used, i.e. from the position 9a in FIGS. 1, 2 or 3, the equal magnification position of the zoom lens system is detected by a photosensor (or photo-interrupter) 51 which is fixedly secured to the rear frame 25 and by a slit (or mask) 52 which is adjustably mounted on the guide rail 29. With the reduction magnification side (or the enlargement magnification side) masked with the photosensor 51 and the slit 52, then it can be electrically detected whether the zoom lens system is on the reduction magnification side or the enlargement magnification side. The detected signal can be used to provide interlocking for devices other than the zoom lens system.

The case where a magnification variation factor m (<1) is obtained by moving the zoom lens system to the position 9b from the position 9a in FIG. 1 will be described. To accomplish this, it is necessary that while the rear group lens system 23 is moved by y in FIG. 2, the distance between the front group lens system 22 and the rear group lens system 23 be changed to z' from z and that the zoom lens system be moved by x (<0). This action will be described more concretely.

In FIG. 4, a number of pulses which corresponds to the amount of movement y of the rear frame 25 and signals representative of the direction of movement are applied to the stepping motor 34. As a result, the motor 34 turns the feed screw 35 in the direction of the arrow so that the rear frame 25 and the cam 38 and the pinion gear 42 on the rear frame 25 are moved by the desired amount movement y in the direction of the arrow D while the cam 38 is turned through a rotational angle corresponding to the amount of movement y due to the engagement of the pinion gear 42 with the rack 41. As the cam follower 39 rolls on the curved surface of the cam 38, the distance between the front group lens system 22 and the rear group lens system 23 is changed to z' from z. At the same time, the cam follower 48 mounted on the rear frame 25 is moved through the distance y and rolls on the lead cam 49 thereby moving the zoom lens system by x in the direction of the arrow F.

Figure 2:
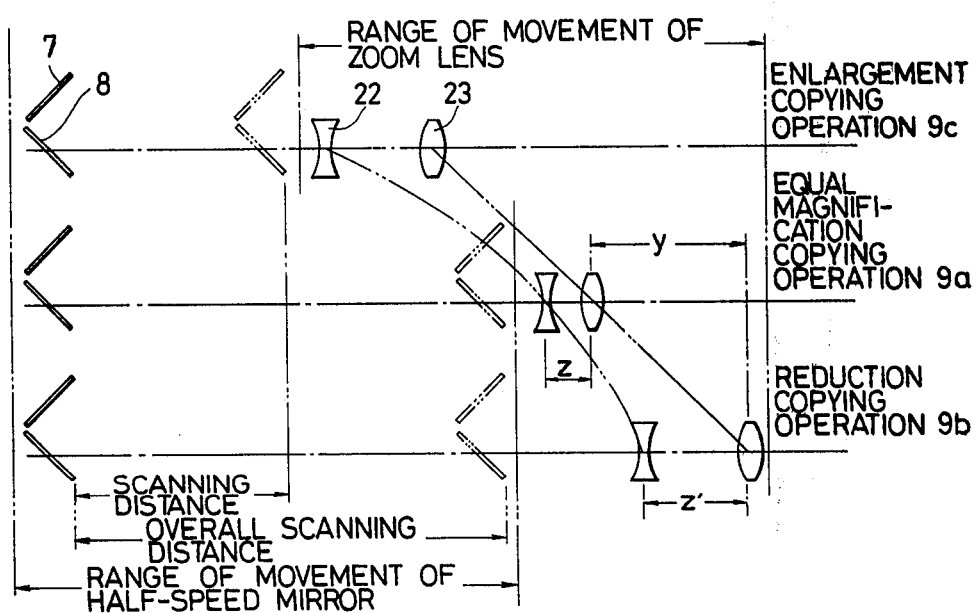
FIG. 2 is an explanatory diagram indicating the relation between the movement of a half-speed mirror and the movement of a zoom lens system.

As is apparent from the above description, in the above-described magnification varying unit, a number of pulses corresponding to the specified magnification position and the direction of movement are applied to the stepping motor to turn the latter so that the zoom lens system is moved to the specified magnification position from the equal magnification position as indicated in FIGS. 2 or 3. Thus, the image of the original can be copied accurately as desired with the aid of the magnification varying unit 11.

Figure 10:
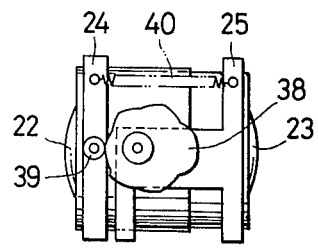
FIG. 10 is a diagram showing a cam which is modified so as to be suitable for a discontinuous magnification copying operation.

If, in the same optical system of the invention, the number of pulses applied to the stepping motor is suitably determined and the configuration of the cam 38 is modified as shown in FIG. 10, then a discontinuous magnification copying operation can be carried out according to particular magnifications (for instance, 1.4, 1 and 0.7 times).

As is apparent from the above description, according to the invention, a zoom lens system is employed as the copying optical system and the region of movement of the zoom lens system in the enlargement copying operation is shared with the region of movement of the half-speed mirror for equal-magnification and reduction copying operations with the result that the copying machine is made small in size. Furthermore, in the magnification varying unit according to the invention, one motor, which can be easily controlled by a numerical control unit such as a microprocessor, is used to set the zoom lens system to a position corresponding to a desired or given magnification factor. Accordingly, with the aid of the magnification varying unit, a variable magnification copying optical system having a low manufacturing cost and high accuracy is provided.

What is claimed is:

1. A variable magnification copying device having a copying optical system capable of enlarging and reducing the image of an original, comprising: full-speed mirror means for scanning a predetermined copying size document; a half-speed mirror following said full-speed mirror; a zoom lens system and means for moving said zoom lens system following said half-speed mirror wherein a region of movement of said zoom lens system for an enlargement copying operation is shared with a region of movement of said half-speed mirror for an equal magnification copying operation and a reduction copying operation.

2. A variable magnification copying device having a copying optical system capable of enlarging and reducing the image of an original, comprising: a full-speed mirror for scanning a predetermined copying size document; a half-speed mirror following said full-speed mirror; a zoom lens system; and means for moving said zoom lens system following said half-speed mirror wherein a region of movement of said zoom lens system for an enlargement copying operation is shared with a region of movement of said half-speed mirror for an equal magnification copying operation and a reduction copying operation, said zoom lens moving means comprising an electric drive motor, a mechanism for moving said zoom lens system in the direction of the optical axis thereof in response to rotation of said electric motor to set said zoom lens system to a position corresponding to a specified magnification, and a mechanism for for moving said zoom lens system perpendicularly to said optical axis to set a copying image of said original at a predetermined position, whereby the image of said original is copied with a desired magnification.

3. The device as claimed in claim 2 in which said mechanism for moving said zoom lens system in the direction of said optical axis to set said zoom lens system at a position corresponding to a specified magnification comprises a feed screw driven by said electric motor, a nut threadedly engaged with said feed screw and coupled to a frame member of said zoom lens system, a cam, a cam follower abutting against said cam, a pinion gear for turning said cam, and a rack engaged with said pinion gear.

4. The device as claimed in claim 3 in which said mechanism for moving said zoom lens system perpendicularly to said optical axis to set the copying image of said original at a predetermined position comprises a lead cam and a cam follower, said cam follower being moved along said lead cam in response to rotation of said feed screw.

5. A variable magnification copying device having a copying optical system capable of enlarging and reducing the image of an original, comprising:
a full-speed mirror for scanning a predetermined copying size document;
a half-speed mirror following said full-speed mirror;
a zoom lens system including a front frame supporting a front group lens system, a rear frame supporting a rear group lens system and a spring urging said front and rear frames together; and
zoom lens moving means for moving said zoom lens system following said half-speed mirror, said zoom lens moving means comprising an electric drive motor, a first mechanism for moving said zoom lens system in the direction of the optical axis thereof in response to rotation of said electric motor to set said zoom lens system to a position corresponding to a specified magnification, and a second mechanism for moving said zoom lens system perpendicularly to said optical axis to set a copying image of said original at a predetermined position, whereby the image of said original is copied with a desired magnification, said first mechanism comprising a feed screw driven by said electric motor, a nut threadedly engaged with said feed screw and coupled to said rear frame member to move said rear frame member in response to rotation of said feed screw, a rack extending substantially parallel to said feed screw, a pinion gear rotatably mounted on said rear frame, a cam turned by said pinion gear, and a cam follower mounted on said front frame abutting said cam, wherein the distance between said front and rear frames is determined by the rotational position of said cam.

6. The device as claimed in claim 5 wherein said mechanism for moving said zoom lens system perpendicularly to said optical axis to set the copying image of said original at a predetermined position comprises a frame upon which said zoom lens system and said mechanism for moving said zoom lens system in the direction of said optical axis are mounted, said frame being slidable perpendicularly to said optical axis, a lead cam formed on a stationary base member, a second cam follower coupled to said frame and abutting said lead cam, and a spring for urging said second cam follower into engagement with said lead cam.

7. The device as claimed in claim 6 wherein said front and rear frames of said zoom lens system comprise ball bearings for rotatably supporting said front and rear frames on a guide rail portion of said base frame and further comprising a guide bar mounted on said base frame substantially parallel to said feed screw, said guide bar extending through apertures in said front and rear frames on a side thereof opposite said ball bearings.

8. The device as claimed in claim 6 in which said cam is provided with lobe portions corresponding to fixed magnification factors.

9. The device as claimed in claim 6 further comprising means coupled to said rear frame of said zoom lens system for detecting the position of said zoom lens system in said direction of said optical axis.

* * * * *